United States Patent Office 2,786,332
Patented Mar. 26, 1957

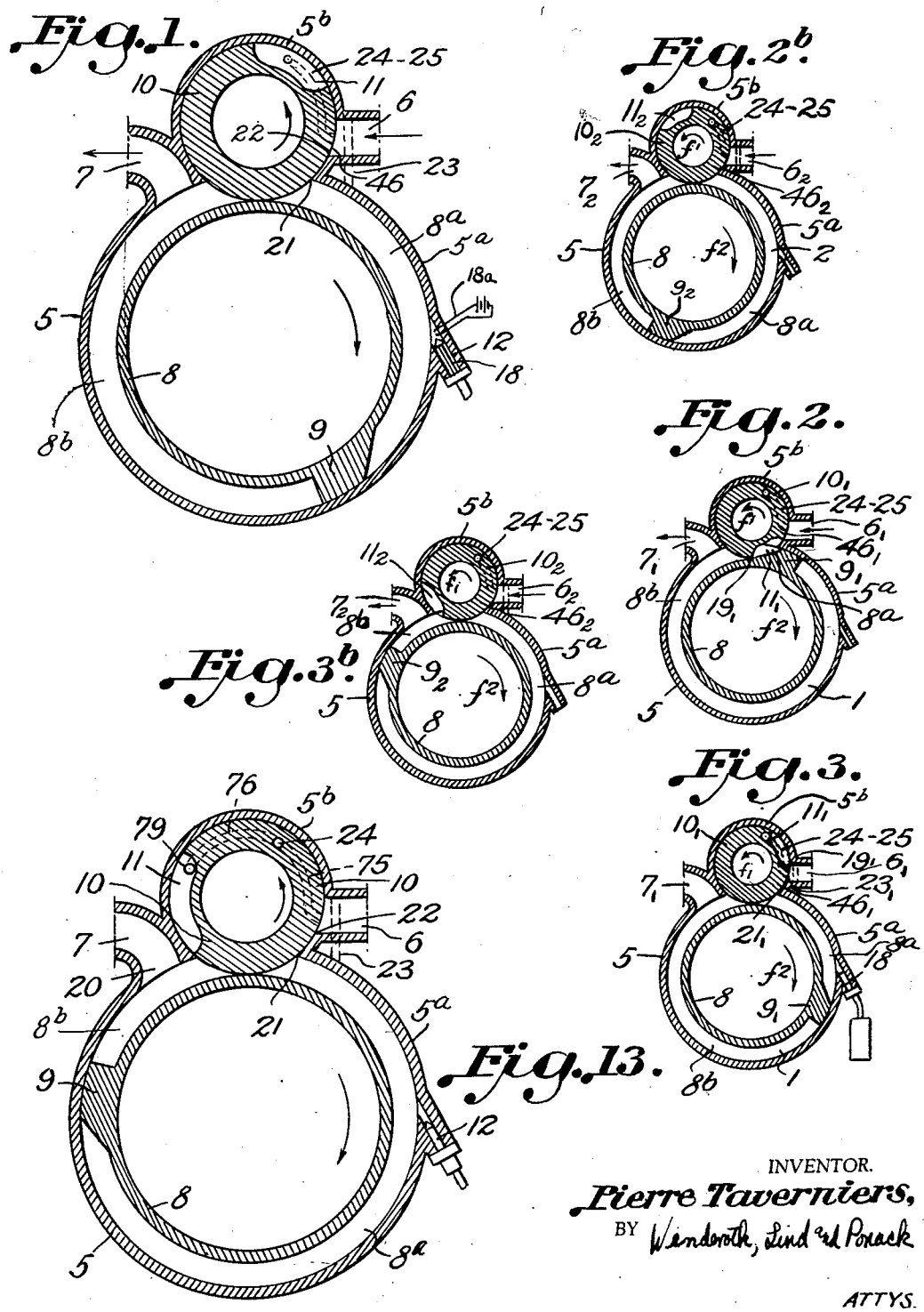

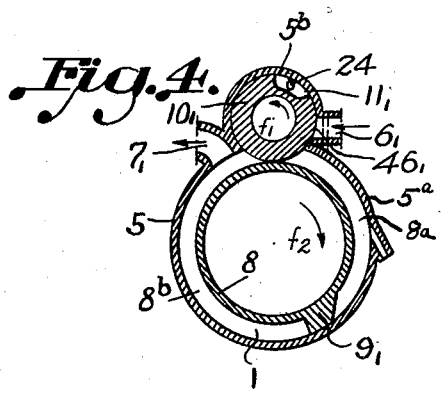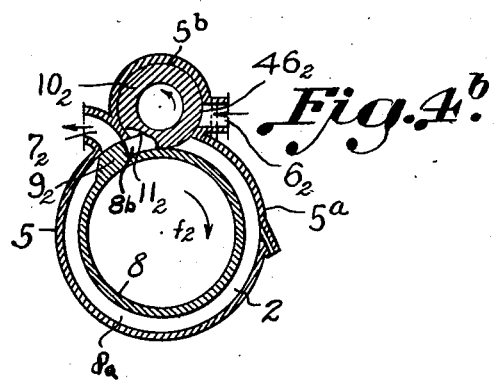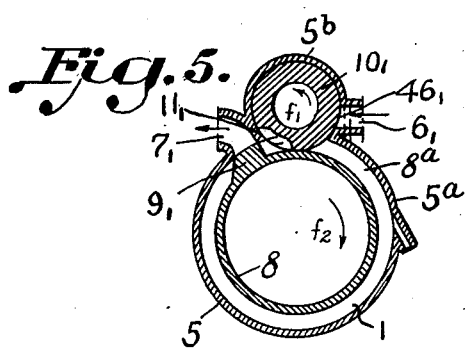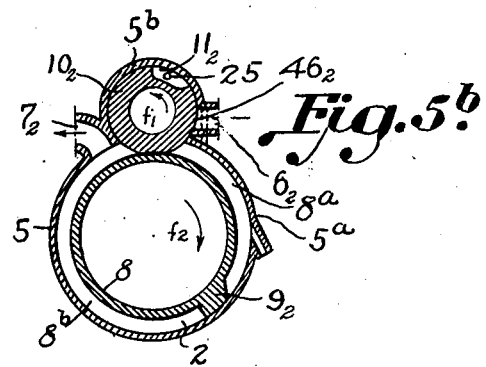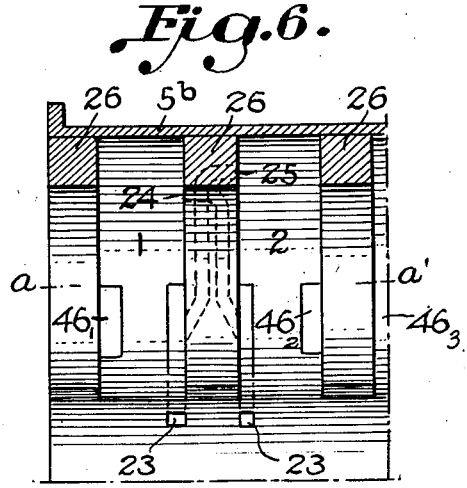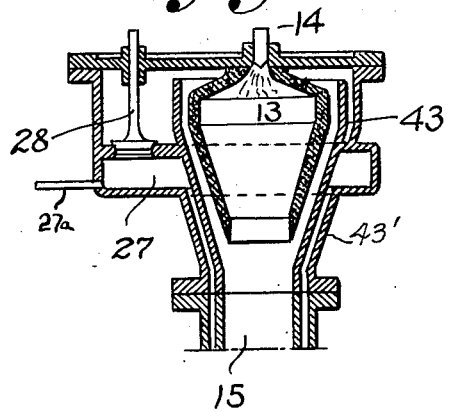

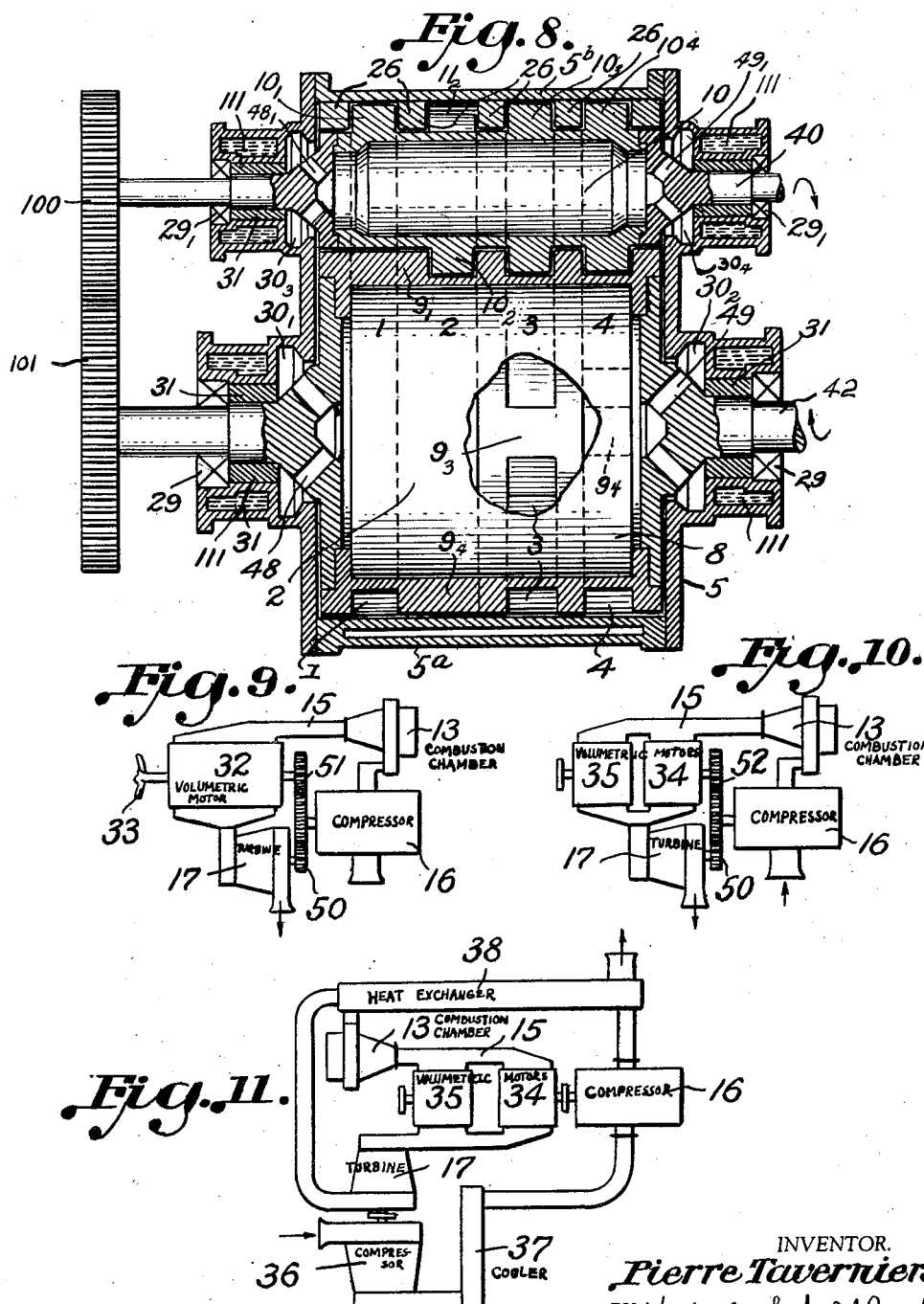

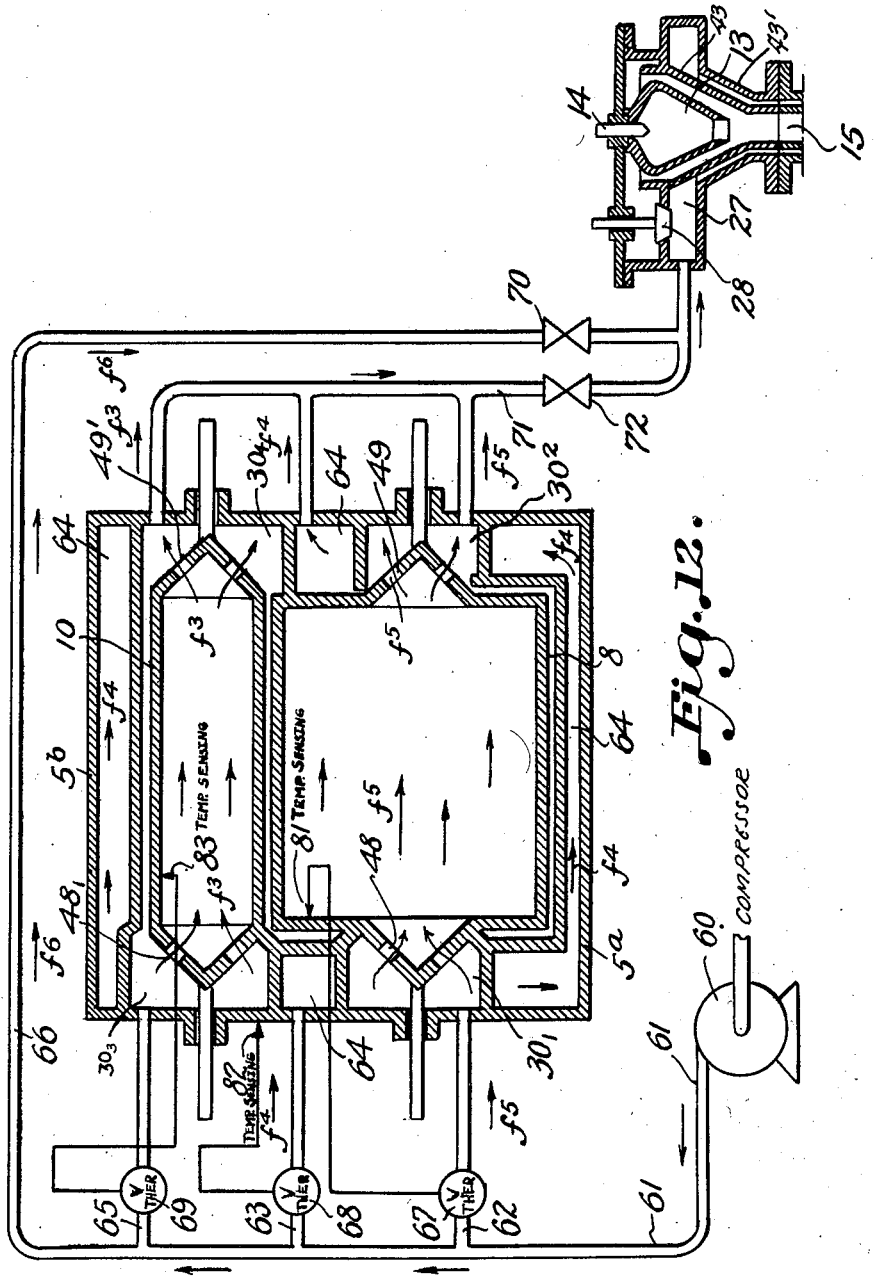

2,786,332

ROTARY COMBUSTION ENGINE AND COOLING THEREOF

Pierre Taverniers, Paris, France

Application September 25, 1950, Serial No. 186,533

Claims priority, application France September 29, 1949

3 Claims. (Cl. 60—39.61)

It is known that, in a motive power installation, the motive power couple can be varied in relation to the resisting couple by the combination of two volumetric rotative motive power mechanisms having independent speeds and fed in parallel by the gas coming from a combustion chamber. One of the mechanisms drives a volumetric compressor and the necessary means to maintain the operation of the engine, the other mechanism provides the available power.

In this process, described especially in the French patents, No. 914,059 of September 4, 1945, and No. 933,612 of September 11, 1946, an increase in the load applied to the rotating motive power mechanism, supplying the available power, results in a decrease in the speed of this motive power mechanism. This causes an increase in pressure and an increase in the speed of the other motive power mechanism driving the compressor, which increases the volume of the gases supplied to the combustion chamber and therefore, the volume of the combustion gases. The motive power couple increases, consequently, in order to respond to the increase in load.

The present invention relates to volumetric rotative motive power mechanisms which can be used especially in motive power installations similar to those described in the previously mentioned patents.

The invention relates to a volumetric motive power mechanism having a cylindrical rotor with blades or vanes turning in a housing and characterized by a cylinder turning in a housing at the same angular speed as the rotor and acting at the same time as a distributing valve between two annular chambers one on each side of one of the blades or vanes by leading to the chamber during operation the gases the power of which is to be used. This arrangement allows the elimination of all reciprocating parts, thus resulting in a compact engine.

Based on this invention, a method of construction of the volumetric engine, in accordance with the preceding paragraph is characterized by the fact that the distributing valve cylinder has a slot in which the rotor vane engages while passing the distributing valve cylinder; the slot of the cylinder being connected to the intake and exhaust pipes of the housing and thus controlling the inlet of the combustion gases behind the rotor vane and the exhaust of these gases, once expanded, which permits obtaining an intake at constant pressure during an appreciable angle of rotation of the rotor.

Further, the slot of the distributing valve cylinder assures, first, the direct communication between the combustion gas intake pipe and the annular space located between the housing and the rotor behind the vane, and then the indirect intake of these gases into this space by means of an intermediary lateral conduit, the intake of these combustion gases into this space thus being extended over an appreciable angle of rotation of the rotor.

In addition, the housing in which the vane-equipped rotor rotates has a fuel injector which projects into the annular space towards the end of the intake period, which allows the injection of a certain quantity of fuel which, by igniting on mixing with the hot gases entering the space, raises the temperature and pressure of these gases.

The invention concerns, also, the combining on the same drum-shape rotor, of several volumetric motive power elements, identical with those described above, the annular spaces between the rotor and casing being formed by annular open grooves located in this rotor, the extremities of these grooves being separated by the vane or blade.

The invention also covers a volumetric rotative engine characterized by the fact that the above-described rotor is coupled to a distributing valve cylinder having protruding portions which extend into grooves in the distributing valve housing part of the casing, each protruding portion having a slot into which the corresponding vane on the rotor fits as it passes.

The volumetric motive elements, placed side by side on the same rotor are angularly shifted in relation to each other and distributed on the entire circumference of the rotor, which permits control of the motive force applied to the rotor shaft.

The invention also relates to the characteristics hereinafter described and to their various possible combinations.

Volumetric rotative mechanisms according to the invention, are represented, as an example, by the attached drawing, in which:

Figure 1 is a schematic cross-section of one element of a volumetric motive power mechanism according to the invention along a plane perpendicular to the axis of rotation of the mechanism.

Figures 2, 3, 4 and 5 show an element like that of Fig. 1 which is a first element in a series of such elements in a motor according to the invention in the different phases of the operation of the element, and in these figures the parts which are similar to but not the same as the corresponding parts in other elements in the series have been identified by a subscript 1.

Figures 2b, 3b, 4b and 5b show an element which is second in a series of elements and which is immediately adjacent the element shown in Figs. 2–5 in the phases corresponding to Figures 2–5, and in these figures the parts which are similar to but not the same as the parts in the other elements in the series have been identified by subscript 2.

Figure 6 is an axial cross-section of the distributing valve part of the casing with the cylinder and projecting portions removed.

Figure 7 is an axial cross-section of the combustion chamber.

Figure 8 is a cross-section of the machine consisting of four elements on a plane passing through the axes of the rotors.

Figure 9 is a schematic view of an installation, suitable for driving a ship's propeller.

Figure 10 is a schematic view of an installation operating as a torque converter.

Figure 11 is a schematic view of the installation of Figure 10 with slight modifications.

Figure 12 shows schematically the entire system of compressed air piping of an installation according to the invention.

Figure 13 is a cross-sectional view perpendicular to the axis of rotation of a simplified form of the invention having a single rotor.

The element of the volumetric rotative motive power mechanism shown in Figure 1 includes a casing or housing 5, composed of two cylindrical parts 5a and 5b, having parallel axes and of different diameters, which parts are interconnected.

This casing has a gas intake pipe 6 connected to the small part 5b of the casing, the connection being spaced from the large part 5a. On the opposite side of the casing the exhaust pipe 7 is mounted, which is connected to the large part 5a of the casing adjacent the point at which it is connected to the small part 5b.

In the large part 5a of the casing a hollow rotatable rotor 8 rotates, the rotor being formed by a driving cylinder located within part 5a of the casing, and having, between its exterior surface and the interior surface of the casing 5a, an annular chamber 8a, 8b.

This rotor 8, keyed to the driving shaft, has on its periphery and along a generatrix, a tooth 9, shown in Figs. 2–5 as $9_1$ and in Figs. 2b–5b as $9_2$, which rotates very near to, but without actually touching the inside surface of the part 5a of the casing. Annular chamber 8a is behind vane 9 and annular chamber 8b ahead of vane 9.

In the small part 5b of the casing 5 is placed a hollow distributing valve cylinder 10, having a protruding portion shown in Figs. 2–5 as $10_1$ and in Figs. 2b–5b as $10_2$, the exterior surface of which rotates at a very small distance from the surface of part 5b of the casing and from the exterior cylindrical surface of rotor 8, but without actually touching them, nor rubbing them. The exterior surface of the protruding portion of cylinder 10, has a slot 11, shown in Figs. 2–5 as $11_1$ and in Figs. 2b–5b as $11_2$ parallel to the generatrix of this cylinder 10, and of which the depth is equal to that portion of the tooth 9 protruding from the rotor 8 into the slot.

The distributing valve cylinder 10 and rotor 8 can be mechanically coupled, for example, by spur gears 100 and 101 (Fig. 8) so as to rotate inversely in relation to each other, but at the same angular speed.

Casing 5 is equipped, finally, with a pipe 12, inclined in a direction almost tangent to part 5a of the casing, into which is placed a fuel injector 18.

Elements identical to those described above can be placed side by side on the same shaft.

The element of Figs. 2b–5b is side by side with that of Figs. 2–5.

In the engine represented in axial cross-section in Figure 8, four elements are placed on the same shaft.

The engine includes a single casing or housing 5, composed of two cylindrical parts 5a, 5b.

In the large part 5a of the casing 5 is coaxially placed the hollow rotor cylinder 8, having on its periphery four rectangular shaped grooves, 1, 2, 3, 4, the extremities of which are separated by teeth or vanes $9_1$, $9_2$, $9_3$, $9_4$.

The hollow rotor cylinder 8 is keyed to a driving shaft 42, turning in bearings 29 in the frame.

The four teeth or vanes $9_1$, $9_2$, $9_3$, $9_4$, are spaced around the periphery of the rotor 8 in a regular manner, for example, in the case of Figure 8, the teeth $9_1$ and $9_2$, are diametrically opposed and in the plane of the drawing and teeth $9_3$ and $9_4$ are diametrically opposed and in the axial plane, perpendicular to the teeth $9_1$ and $9_2$. The spacing of the teeth or vanes from each other is thus 90°. The order of passage of the teeth past a given point is $9_1$, $9_3$, $9_2$, $9_4$.

With each groove 1, 2, 3, 4, of rotor 8, is associated a projecting portion of a distributing valve cylinder 10. The projecting portions $10_1$, $10_2$, $10_3$ and $10_4$ fit in the corresponding groove 1, 2, 3, 4, of the rotor. The cylinder 10 is keyed to shaft 40, turning in bearings 29', on the frame.

Each portion $10_1$, $10_2$, $10_3$, $10_4$ which protrudes has a slot $11_1$, $11_2$, $11_3$, $11_4$, into which the corresponding tooth or vane $9_1$, $9_2$, $9_3$, $9_4$, on the rotor 8 can penetrate in passing. The depth of the slots is equal to the amount by which the teeth protrude from the rotor.

The cylindrical part 5b of the casing (Figure 6) has interiorly placed rings 26, spaced from each other to provide the grooves for the protruding portions $10_1$, $10_2$, $10_3$, $10_4$ of the distributing valve cylinder 10.

Each intake pipe 6 ends in an inlet port 46, shown in Fig. 6 as inlet ports $46_1$, $46_2$ and $46_3$ located in the side of the corresponding groove in the part 5b, while on the opposite side, a pipe 23, connects the groove with the corresponding groove in part 5a of the casing.

Finally, in the ring 26 separating the grooves in the part 5b are bored two conduits 24, 25, connecting the groove 1 for one projecting portion with the groove 2 for the adjacent projecting portion.

*Operation.*—Let us consider the two teeth $9_1$ and $9_2$ and distributing valve portions $10_1$ and $10_2$, 180° out of phase as shown in Figure 8.

(a) *Start of intake (Figure 2 and Figure 2b.).*—The distributing valve cylinder 10, turns in the direction of arrow $f_1$, and the slot $11_1$ in the first element will start to open the inlet port $46_1$ of the intake pipe $6_1$. The tooth $9_1$, turning in the direction of arrow $f_2$, has just left slot $11_1$ of the distributing valve cylinder and is beginning to enter the part 5a of housing 5. The fluid coming from a combustion chamber, not shown, begins to pass from pipe $6_1$ into the annular chamber 8a behind vane $9_1$. The annular chamber 8b ahead of this vane connects with the exhaust pipe $7_1$. During this time, the fluid under pressure introduced during the intake period for the adjacent element expands behind tooth $9_2$, while this tooth forces the expanded gas ahead of it and out the exhaust pipe $7_2$.

(b) *End of intake (Figure 3 and Figure 3b).*—The distributing valve cylinder $10_1$, in turning in the direction of arrow $f_1$, has brought the trailing edge $19_1$ of the slot $11_1$ to a point coinciding with the wall of the intake pipe $6_1$. The gases, under pressure have entered the annular chamber 8a behind the vane $9_1$ during the interval slot $11_1$ extended across the opening between parts 5a and 5b and across the inlet port of pipe $6_1$, and they push vane $9_1$, like a piston in a cylinder, thus providing a driving effort.

The cylindrical wall of the housing between points $21$ and $22$ (Figure 1) and the cylindrical external surface of the distributor valve cylinder 10, form a guard which assures a sufficient tightness between the intake pipe 6 and the annular space 8a between housing 5 and the rotor 8. As soon as point $19_1$ on the distributing valve cylinder 10 has arrived at point $21_1$ of the part 5b, the direct intake of the gases to chamber 8a is cut off.

The slot $11_1$ in the distributing valve cylinder projecting portion still faces inlet pipe $6_1$ and continues to allow combustion gases to pass to the annular chamber 8a from the port $46_1$ in the intake pipe $6_1$ through slot $11_1$ to the pipe $23_1$. The intake at constant pressure and the corresponding driving effort stops when point $19_1$ of the shutoff cylinder arrives at the upper edge of port $46_1$, and the port of duct $23_1$, that is, on the line a—a' of Figure 6.

At the end of the intake represented in Figure 3, slot $11_1$ in the distributing valve cylinder projecting portion $10_1$ opens the orifice of conduit 24, and the combustion gases inclosed in this slot are conducted into a neighboring groove in part 5b, between the distributing valve cylinder projecting portion $10_2$ and the tooth $9_2$. The neighboring distributing valve cylinder projecting portion $10_2$ is at that moment in the position represented in Figure 3b and this element thus receives the hot gases under pressure, which were inclosed in the slot $11_1$ of the distributing valve cylinder projecting portion $10_1$ of the first element. These gases expand and furnish a driving force, which continues until the moment when the moving parts have reached the respective positions shown in Figure 4 and Figure 4b.

In the positions shown in Figure 4 and Figure 4b, the slot $11_1$ in the projecting portion distributing shutoff cylinder $10_1$ of the first element is at the exhaust pressure and the annular chamber 8b included between the projecting portion $10_2$ and the tooth $9_2$ of second element are at the exhaust pressure.

When the annular chamber 8a between the projecting portion $10_1$ and the tooth $9_1$ (Figure 3) is completely closed (position of Figure 3) an injection of fuel by means of an injector 18 located in tube 12 of the housing occurs and is ignited, the hot gases, thereby raising the temperature of the introduced gases still higher.

The expansion of the very hot, high pressure gases begins immediately, displacing tooth $9_1$ and furnishing a driving force.

(c) *Expansion* (*Figure 4 and Figure 4b*).—As the projecting portion $10_1$ and the rotor 8, continues to turn, the moving parts arrive in the position shown in Figure 4, and the gases inclosed in the annular chamber $8a$ have already begun to expand, while the annular chamber $8b$ ahead of tooth $9_1$ is open to the exhaust. At this moment, the second element (Figure 4b) having reached the point at which the gases therein are at the condition of maximum expansion is completely filled by gases at relatively low pressure and temperature.

This second element can also be cooled and the equilibrium temperature of the driving drum is consequently lowered.

(d) *Exhaust* (*Figures 5 and 5b*).—Tooth $9_1$ begins to open the orifice of the exhaust conduit $7_1$, and the annular chamber $8a$ located behind this vane $9_1$, and containing the expanded gases, arrives at the exhaust. The first element becomes cool along nearly its entire periphery, as was the case with the second element in its preceding phase.

The parts of the second element are, at this moment, in the position shown in Figure 5b. The injection of the fuel has taken place and the expansion of the high pressure hot gases begins.

Slot $11_2$ in projecting portion $10_2$ which, from the end of the intake for the second element was in communication through conduit 25 with the part of the annular chamber $8b$ of the first element has given to this element the balance of the gases contained in this slot $11_2$ at intake pressure and temperature.

The first element is then at the exhaust and the gases remaining at this moment in this slot $11_2$ have the exhaust temperature and pressure. The group having the third and fourth elements operates in the same manner as the group having the first and second elements.

Summing up, in each volumetric rotative driving element the operating cycle comprises:

(a) A continued intake at constant pressure during a certain angle of rotation of the rotor.

(b) Following this intake at constant pressure, a heating and a gaseous balance by combustion of the introduced fuel, this combustion taking place in an increasing volume because of continued rotation during the time of the fuel injection.

(c) An adiabatic expansion generatrix of a driving couple. All the gases introduced into the element at the intake participate in effect in this expansion, notably by the intermediary of the communication ducts.

(d) A continued and extended exhaust of the expanded gases.

In the above described machine, the injection of fuel by injector 18, can be eliminated, the intake taking place only in gaseous form.

The device can operate also without the burner 14, there being introduced by the intake conduit 6 only charges of compressed air. The fuel injection then takes place only by means of the injector 18.

In this case, ignition takes place spontaneously in proportion to the fuel injection into the hot compressed air. It may take place by a spark from sparking means $18a$ (Fig. 1).

There is represented schematically in Figure 12, as an example, a group of compressed air ducts for an engine installation according to the invention.

This installation includes an air compressor 60, forcing the air to the engine through a conduit 61 in four distinct circuits:

One of them, 62, extends into annular intake chamber $30_1$, which, through the ducts 48 and 49, supplies the interior of the rotor 8.

The second, 63, opens into the double casing 64 of the housing $5a$, $5b$.

The third, 65, ends at the annular chamber $30_3$, supplying through ducts $48_1$ and $49_1$, the interior of the distributing valve cylinder 10.

The fourth, 66, forms a by-pass, and causes the discharge from the compressor 60 to be conducted directly to chamber 27 surrounding the burner.

Thermostatic valves 67, 68, 69, 70 are inserted, one in each of these conduits.

Annular chambers $30_2$ at the outlet of the rotor 8, and $30_4$ at the outlet of cylinder 10, and the outlet of the double casing 64 communicate with a conduit 71 connected to chamber 27 through a valve 72.

Therefore, by means of valves 67, 68, 69, 70 and 72 the discharge of air into each of the circuits can be controlled, and consequently, the temperature of rotor element 8, cylinder 10, and housing parts $5a$ and $5b$ into which this air circulates can be controlled. This control, which can be obtained for example by an appropriate thermostatic system, permits, especially by control of the dilations, to reduce to a minimum, the play between the fixed parts and the turning parts while the parts are hot, and to obtain good tightness of the expansion and combustion chambers.

In the case shown in Figure 12, for example, this thermostatic system includes three temperature sensing elements 81, 82, 83.

The temperature sensing element 81 is in contact with rotor 8 and controls thermostatic valve 67. The temperature sensing element 82 is in contact with the exterior casing of housing 5 and controls theremostatic valve 68. Finally, the temperature sensing element 83 is in contact with distributor valve cylinder 10 and controls thermostatic valve 69.

In the machine installations using volumetric driving mechanisms conforming to those described, it would be advantageous to create a reserve of compressed air susceptible of being used in case of peak loads or when engine acceleration is required.

Combustion chamber 13 (Figure 7) is fed with liquid fuel by injector 14 and surrounded by the converging air pipe 43, opened at the rear for the entrance of compressed air. According to the invention, this pipe 43 can be surrounded by a chamber 27, which connects the air intake $27a$ to the combustion chamber, by a valve 28.

In the case shown in Figure 8, the casing or housing 5 has a double wall which communicates through a branch and pipe 71 with chamber 27 surrounding combustion chamber 13, and compressed air circulates in the space within a double wall 43—43' around the combustion chamber 13.

In this double wall, the compressed air is heated before being sent into combustion chamber 13.

The double wall also permits reducing the heat losses by radiation.

In the case shown in Figure 8, the rotor 8, in which are located grooves 1, 2, 3, 4, is hollow and receives the compressed air from an annular chamber $30_1$ and ducts 48. This air, after having passed through the hollow drum 8, leaves by the ducts 49 and the annular chamber $30_2$.

The distributing valve cylinder 10 with projecting portions $10_1$, $10_2$, $10_3$, and $10_4$ is also hollow, and the compressed air passes through it in the same manner.

The annular intake chambers $30_1$ and $30_3$ and exhaust chambers $30_2$ and $30_4$ are closed exteriorly by gaskets 31, forming a joint around the rotor shaft. The rotor shafts 40 and 42 are mounted in bearings $29_1$ and 29 respectively, which in turn are mounted in casing parts $5b$ and $5a$ and are water cooled by jackets 111.

Thus the expansion of rotor 8, which would cause the jamming of tooth 9 against casing 5, is avoided by the corresponding expansion of this casing 5. Likewise, the expansion of rotor 8 and cylinder 10 which would cause jamming of these parts is compensated by the corresponding expansion of the casing, the distance between the supports holding the bearings 29 of these rotative elements being increased in such a manner that the play between these elements is sufficient, even when hot.

The assembly of a machine installation is represented in Figure 9.

This installation includes a combustion chamber 13, from which the gases escape by pipe 15 to a volumetric machine 32, conforming to that described and driving a ship propeller 33.

The gases escaping from this first volumetric machine have still energy sufficient to operate a driving turbine 17, which through gears 50, drives a compressor 16, which supplies the air to the combustion chamber 13.

The compressor 16 is also connected by gearing 51 with the shaft of the volumetric rotative machine 32.

In the case shown in Figure 10, the installation includes a combustion chamber 13, from which the gases escaping by pipe 15, operate, in parallel, on the one hand, a volumetric rotative machine 34, which through gears 52, drives the compressor 16, which supplies the air into the combustion chamber 13, and, on the other hand, a volumetric rotative machine 35, the output of which may be utilized elsewhere.

The gases escaping from the volumetric rotative machines 35 and 34 pass into a driving turbine 17 which drives the compressor 16 through the gears 50.

In the case shown in Figure 11, the installation includes a combustion chamber 13, from which the gases escaping by pipe 15 feed two volumetric machines 35, 34, in parallel, one of them, 35, supplying the available power, the other one, 34, driving the compressor 16. This compressor 16 supplies the air to combustion chamber 13, passing it through a heat exchanger 38, through which the exhaust gases pass before they are discharged into the atmosphere.

The gases escaping from the volumetric machines 34 and 35 operate an independent driving turbine 17, operating a compressor 36, which takes the exterior air and supplies it to compressor 16 through a cooler 37.

The gases escaping from driving turbine 17 pass into exchanger 38 before escaping into the atmosphere, in which they yield, to the compressed air, some of the heat that they might still have.

Although in the examples described, the machines include pairs of elements operating in a combined manner, the invention also includes a simplified form, having but one rotor 8 and only one distributing valve cylinder 10 (Figure 13).

In this case, the orifice 24, located in the housing 5b, communicates by a pipe 75 with the pipe 23, described above, and this orifice 24, extends by an opened groove 76, located in the end of this housing 5b.

In this manner, the high pressure hot gases contained in slot 11 empty into the annular space 8a, included between the casing 5a, the rotor 8, the cylinder 10 and the tooth 9, through the opened groove 76 and pipes 75 and 23.

This opened groove 76 is extended just to the point 79 (Figure 13) in such a manner that the groove is closed off when the forward part of the slot 11 arrives at point 20, after which the slot 11 is at the exhaust.

The hot compressed gases contained in the slot 11 are thus utilized to the maximum to extend the expansion, that is to say, the driving action, before this slot 11 arrives at the position of exhaust.

The volumetric machines and the installations described above present numerous technical advantages, notably the following:

(1) The volumetric rotative machines described above have a speed which is a function of the upper pressure, and the weight of the gas which passes through is a function of their speed.

When the machine installation has two volumetric machines in parallel, one of them furnishing the usable power, the other driving the compressor, the speed of the machine supplying the usable power slows down if the load increases, which causes an increase in the upper pressure and an increase in the speed of the volumetric machine driving the compressor. The amount of the air supplied to the combustion chamber increases and the same is true for the volume of the combustion gas. The reduction in speed results, then, in an increase in the couple. The machine installation which functions as convertor of the torque, thus permits eliminating the change of speed.

(2) The distributing valve cylinder 10 plays a multiple role:

(a) It forms a shutoff for the annular space included between the rotor 8, the housing 5a and the tooth 9, in which are inclosed the combustion gases under pressure. Its slot 11 permits the tooth 9 to pass the cylinder 10.

(b) It forms a direct intake distributor (position shown in Figure 2), the gases passing from the intake pipe 6 to the annular space, through this slot 11.

(c) It forms a distributor for the end of the intake, by sending the combustion gases into the annular space by the intermediary of the duct 23.

(d) It permits putting slot 11 in the position of exhaust through the duct 24, so that the gases contained in this slot are utilized during the expansion.

(e) It forms an exhaust distributor (in the position shown in Figure 5).

(3) The volumetric machines conforming to the invention are of simple construction and have neither valves nor reciprocating parts. Their construction cost is low and their wear is greatly reduced.

(4) The play that exists between vanes 9 and this cylindrical wall is at a minimum when the machine is operating, that is to say, when rotor 8 and the housing have reached their equilibrium temperature. This play increases if the machine is cold.

Without exception, tooth 9 never rubs against housing 5. At equilibrium temperatures the play is small enough so that tightness of the expansion chamber is practically achieved. But the absence of contact permits eliminating all lubrication between tooth 9 and the housing wall, and, consequently, permits operating at great speed and with very hot combustion gases.

(5) The quantity of compressed air necessary for the operation of the machine according to the invention is less than in the case of a normal type of turbine.

As an example: The volume of compressed air necessary for combustion in a turbine according to the invention is only three times the theoretical volume of air necessary for this combustion, instead of the six times this volume in the case of known turbines operating under the same conditions.

(6) Because of the reduction in the quantity of necessary compressed air, the machine according to this invention can operate with a higher compression ratio than in the known turbines.

This maximum compression ratio which, in the known turbines, is of the order of 3 to 4 kgs., reaches 10 to 15 kgs. in the case of the present invention.

(7) Each machine element is cold on nearly all its periphery during a certain angle of rotation. The equilibrium temperature of the element is lowered because of that.

Therefore, the volumetric machine according to the invention, can be used with hotter gases than those that can be sent into a turbine of known type.

(8) Because of the advantages described in paragraphs (5), (6), and (7):

Reduction in the quantity of necessary compressed air,
Increase in compression ratio,
Increase in temperature of combustion gases used, the efficiency of the engine can be greatly increased.

(9) The volumetric machines have masses in movement which always turn in the same direction and are easy to keep in equilibrium. The wear, vibrations and noises are thus reduced to a minimum.

(10) In volumetric machines according to the invention, the action of the gases is about continuous for each element.

When the rotor has several elements side by side, the driving couple applied to the shaft is constant.

(11) The circulation of compressed air around the bearings 29 in the double walls of the casing parts 5a and 5b, and in the rotor 8 and cylinder 10 of the machine permits cooling these parts to reduce and to control their expansion, and consequently the play and the gas leakages between the moving and the fixed parts.

I claim:

1. In a volumetric motor a casing composed of two cylindrical parts having parallel axes and intercommunicating, a hollow rotatable rotor having a tooth protruding therefrom rotatable freely in the first cylindrical part of the casing, an exhaust conduit opening out of said first cylindrical part of said casing, an inlet conduit opening out into said second cylindrical part of said casing, a hollow distributing valve cylinder having a slot therein of a depth equal to the portion of said tooth which protrudes from said hollow rotor permitting the passage of said tooth and freely rotatable in said second cylindrical part of said casing at the same angular speed as said rotor, said inlet conduit opening into the second cylindrical part of said casing a distance from the point of intercommunication of said cylindrical parts which is less than the peripheral length of said slot said cylinder being spaced from said rotor and tooth a distance sufficient to prevent contact therewith but preventing all communication between said inlet conduit and said exhaust conduit, means for passing cooling air into said hollow rotor in a direction parallel to the axis of rotation of said rotor, means for regulating the flow of said air, means for passing cooling air into said hollow distributing valve cylinder in a direction parallel to the axis of rotation of said distributing cylinder, and means for regulating the flow of said air, whereby when said tooth has passed the point at which said cylindrical parts intercommunicate, said slot extends from said point of intercommunication to said inlet conduit.

2. In a volumetric motor, a casing composed of two cylindrical parts having parallel axes and intercommunicating, a hollow rotatable rotor having a tooth protruding therefrom rotatable freely in the first cylindrical part of said casing, an exhaust conduit opening out of said first cylindrical part of said casing, an inlet conduit opening out into said second cylindrical part of said casing, a hollow distributing valve cylinder having a slot therein of a depth equal to the portion of said tooth which protrudes from said hollow rotor permitting the passage of said tooth and freely rotatable in said second cylindrical part of said casing at the same angular speed as said rotor, said inlet conduit opening into the second cylindrical part of said casing a distance from the point of intercommunication of said cylindrical parts which is less than the peripheral length of said slot said cylinder being spaced from said rotor and tooth at a distance sufficient to prevent contact therewith but preventing all communication between said inlet conduit and the exhaust conduit, an air compressor, a first circuit passing air pumped by said compressor into the said rotor in a direction parallel to the axis of rotation of said rotor, regulating means controlling the flow of said air, a second circuit independent of said first circuit passing air pumped by said compressor into said hollow distributing valve cylinder in a direction parallel to the axis of rotation of said cylinder and regulating means controlling the flow of said air.

3. In a volumetric motor, a double shell casing composed of two cylindrical parts having parallel axes and intercommunicating, a hollow rotatable rotor having a tooth protruding therefrom freely rotatable in the first cylindrical part of said casing, an exhaust conduit opening out of said first cylindrical part of said casing, an inlet conduit opening out into the second cylindrical part of said casing, a hollow distributing valve cylinder having a slot therein of a depth equal to the portion of said tooth which protrudes from said hollow rotor permitting the passage of said tooth and rotatable freely in said second cylindrical part of said casing at the same angular speed as said rotor, said inlet conduit opening into the second cylindrical part of said casing a distance from the point of intercommunication of said cylindrical parts which is less than the peripheral length of said slot said cylinder being spaced from said rotor and tooth at a distance sufficient to prevent contact therewith but preventing all communication between said inlet conduit and said exhaust conduit, a combustion chamber, means leading gases from said combustion chamber in back of said tooth on said rotor through the intermediary of said distributing valve cylinder, an air compressor, a first circuit conducting air leaving said compressor into said combustion chamber through said rotor in a direction parallel to the axis of rotation of said rotor, means responsive to the temperature of said rotor regulating the flow of said air, a second circuit independent of said first circuit conducting air leaving said compressor into said combustion chamber through said hollow distributing valve cylinder in a direction parallel to the axis of rotation of said cylinder, means responsive to the temperature of said cylinder regulating the flow of said air, a third circuit independent of said first two circuits conducting air leaving said compressor into the space in said double shell of said casing and means responsive to the temperature of the casing regulating the flow of said air.

References Cited in the file of this patent
UNITED STATES PATENTS

| | | |
|---|---|---|
| 1,052,124 | Berger | Feb. 4, 1913 |
| 1,058,157 | Curtis et al. | Apr. 8, 1913 |
| 2,070,631 | Sunderland | Feb. 16, 1937 |
| 2,112,391 | Anxionnaz | Mar. 29, 1938 |
| 2,184,845 | Noack | Dec. 26, 1939 |
| 2,362,705 | Macartney et al. | Nov. 14, 1944 |
| 2,374,710 | Smith | May 1, 1945 |
| 2,447,929 | Berry | Aug. 24, 1948 |
| 2,503,410 | Pouit | Apr. 11, 1950 |
| 2,548,339 | Berry | Apr. 10, 1951 |
| 2,559,814 | Whittle | July 10, 1951 |
| 2,616,256 | Davy | Nov. 4, 1952 |